United States Patent
Losio et al.

(10) Patent No.: US 9,014,554 B2
(45) Date of Patent: Apr. 21, 2015

(54) OPTICAL TRANSPORT NETWORK DELAY MEASUREMENT

(75) Inventors: Giacomo Losio, Tortona (IT); Gilberto Loprieno, Milan (IT)

(73) Assignee: Cisco Technology, Inc., San Jose, CA (US)

(*) Notice: Subject to any disclaimer, the term of this patent is extended or adjusted under 35 U.S.C. 154(b) by 228 days.

(21) Appl. No.: 13/599,065

(22) Filed: Aug. 30, 2012

(65) Prior Publication Data

US 2014/0064722 A1 Mar. 6, 2014

(51) Int. Cl.

| H04B 10/08 | (2006.01) |
|---|---|
| H04J 3/14 | (2006.01) |
| H04L 12/26 | (2006.01) |
| H04B 10/00 | (2013.01) |
| H04B 10/077 | (2013.01) |

(52) U.S. Cl.
CPC ............... *H04J 3/14* (2013.01); *H04B 10/0773* (2013.01); *H04L 43/0858* (2013.01); *H04J 2203/0057* (2013.01)

(58) Field of Classification Search
CPC ............... H04B 10/075; H04B 10/077; H04B 10/0773; H04B 10/0775; H04B 10/079; H04B 10/0793; H04B 10/0795
USPC .......................................................... 398/25
See application file for complete search history.

(56) References Cited

U.S. PATENT DOCUMENTS

| 8,576,388 B2 | 11/2013 | Atkins et al. | |
| 2013/0322872 A1* | 12/2013 | Jobert et al. | 398/25 |

FOREIGN PATENT DOCUMENTS

| EP | 2451099 A2 | 10/2011 |
| WO | WO 2012/045962 A1 * | 4/2012 |

OTHER PUBLICATIONS

Kern et al., "GMPLS RSVP-TE Extensions for SONET/SDH and OTN OAM Configuration," Mar. 2, 2012, draft-ietf-ccamp-rsvp-te-sdh-otn-oam-ext-04, http://tools.ietf.org/html/draft-ietf-ccamp-rsvp-te-sdh-otn-oam-ext-04, The Internet Society, Reston, VA, USA (twenty-two pages).

PCT International Search Report and The Written Opinion of The International Searching Authority for PCT Application PCT/US2013/048839 (which claims priority to U.S. Appl. No. 13/599,065), ISA/EPO, mailed Sep. 17, 2013 (eleven pages).

(Continued)

*Primary Examiner* — Daniel Dobson
(74) *Attorney, Agent, or Firm* — The Law Office of Kirk D. Williams

(57) ABSTRACT

In one embodiment, a one-way delay is measured between optical devices in an optical transport network based on roundtrip times of request and corresponding response frames. A first optical device sends a sequence of delay measurement request frames to a second optical device, which varies a local delay before responding to a request frame, thus causing a slippage in the sequence of reply frames received by the first device. The point at which the request frames are received in relation to the stream of frames sent by the optical device can be identified based on the frame slippage. Therefore, the delay measurement can be adjusted by a corresponding offset to the beginning of a frame in order to increase the accuracy of the one-way delay measurement.

20 Claims, 5 Drawing Sheets

(56) References Cited

OTHER PUBLICATIONS

Leon Bruckman, "Delay Measurement in OTN Networks," http://www.iplight.com/files/wordocs/IPLightApplicationNote-DelayMeasurement.pdf, Apr. 2010, IP Light, Inc., Petach Tikva, Israel (seven pages).

Kihara et al, "System configuration for standardizing SDH-based time and frequency transfer," European Frequency and Time Forum, 1996, EFTF 96., Tenth (IEE Conf. PU BL. 418), Brighton, London, UK, Mar. 5, 1996, pp. 465-470.

\* cited by examiner

OPTICAL TRANSPORT NETWORK DELAY MEASUREMENT

TECHNICAL FIELD

The present disclosure relates generally to performing delay measurements in an optical transportation network based on the communicating of delay measurement request and response frames.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). Reliably communicating information within certain delay tolerances in a network is important. Different techniques may be employed in a network to measure latency in a network, albeit, not always to the level of accuracy needed.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
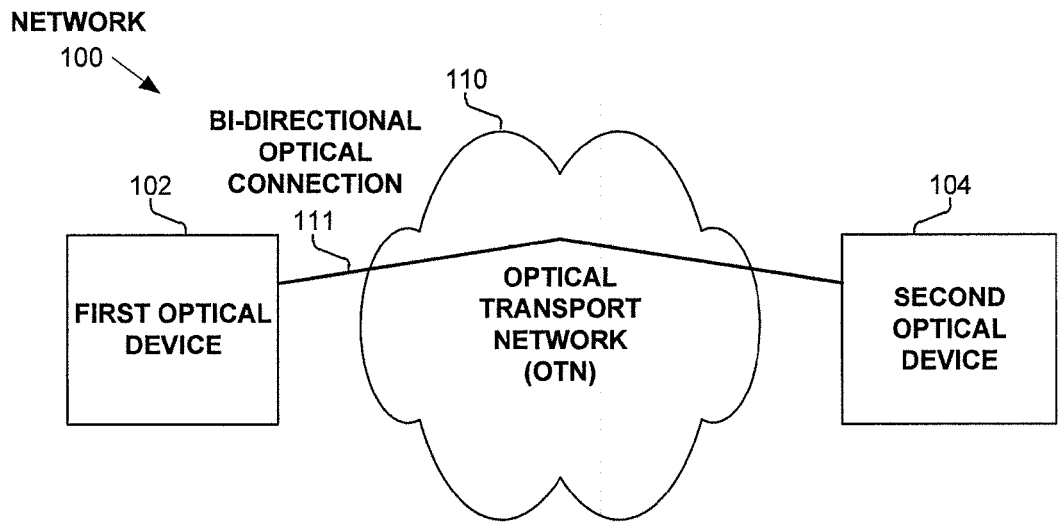
FIG. 1 illustrates a network operating according to one embodiment.

Disclosed are, inter alia, methods, apparatus, computer-storage media, mechanisms, and means associated with measuring delays between optical devices in an optical transport network (OTN). In one embodiment, a first optical device sends a sequence of request frames (e.g., optical frames with a request message embedded in their OTN overhead) towards a second optical device over an optical transport network, which are received by the second optical device.

For each particular request frame of the sequence of request frames, the second optical device sends a particular response frame to the first optical device after imposing a variable delay after receiving the particular request frame and before adding a delay measurement marker to a frame to create the particular response frame. The first optical device receives these response frames. Different pairs of corresponding request frames and response frames are processed to calculate a one-way delay measurement between the first optical device and the second optical device. This processing of different pairs includes identifying a frame slip within the received response frames, and adjusting the one-way delay measurement by an offset value determined based on the identified frame slip.

One embodiment includes an optical device, comprising: an egress optical interface configured to send a plurality of request frames towards a second optical device over an optical transport network; an ingress optical interface configured to receive a corresponding plurality of response frames sent from the second optical device over the optical transport network; and one or more processing elements configured to processing different pairs of a particular response frame of the plurality of response frames and a corresponding particular request frame of the plurality of request frames to calculate a one-way delay measurement between the first optical device and the second optical device; wherein said processing different pairs includes identifying a frame slip within the plurality of response frames, and adjusting the one-way delay measurement by an offset value determined based on said identified frame slip.

One embodiment includes an optical device, comprising: an ingress optical interface configured to receive a plurality of request frames from a first optical device over an optical transport network; an egress optical interface configured to send a corresponding plurality of response frames to the first optical device over an optical transport network; and one or more control elements configured to process each particular request frame of the plurality of request frames, including after a variable delay from receipt of the particular request frame, causing a next frame sent from the egress optical interface to be marked as a delay measurement response frame.

2. Description

Disclosed are, inter alia, methods, apparatus, computer-storage media, mechanisms, and means associated with measuring delays between optical devices in an optical transport network (OTN). In one embodiment, a one-way delay measurement is measured between optical devices in an optical transport network based on roundtrip times of request and corresponding response frames. A first optical device sends a sequence of delay measurement request frames (e.g., optical frames with a request message embedded in their OTN overhead) to a second optical device, which varies a local delay before responding to a request frame, thus causing a slippage in the sequence of reply frames received by the first device. The point within each request frame is identified based on the frame slippage. Therefore, the delay measurement can be adjusted by an offset corresponding to the slippage in order to increase the accuracy of the one-way delay measurement. This offset removes the delay within the second optical device before the second device can send a reply frame. In other words, this offset effectively shifts the receipt time of a request frame to the earliest time that the second optical device can immediately respond in a next frame (i.e., reply frame) sent to the first optical device. Thus, a source of latency within the second optical device is removed from the measurement, making the one-way delay calculation more accurate.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with measuring delays between optical devices in an optical transport network (OTN). In one embodiment, a first optical device sends a sequence of request frames towards a second optical device over an optical transport network, which are received by the second optical device. For each particular request frame of the sequence of request frames, the second optical device sends a particular response frame to the first optical device after imposing a variable delay after receiving the particular request frame and before adding a delay measurement marker to a frame to create the particular response frame. The first optical device receives these response frames. Different pairs of corresponding request frames and response frames are processed to calculate a one-way delay measurement between the first optical device and the second optical device. This processing of different pairs includes identifying a frame slip within the received response frames, and adjusting the one-way delay measurement by an offset value determined based on the identified frame slip.

In one embodiment, said identifying a frame slip includes: calculating roundtrip delays between request and response frames of said different pairs; and identifying a step difference in said roundtrip delays. In one embodiment, the variable delay is an increasing value over the sequence of request frames. In one embodiment, the offset value is the variable delay associated with the response frame immediately after said identified frame slip within said received response frames.

In one embodiment, the variable delay increases by a constant value for each frame of the sequence of request frames. In one embodiment, said determining the offset value based on said identified frame slip within said received response frames includes multiplying the constant value by the number of said received response frames, corresponding to the sequence of request frames, prior to said identified frame slip within said received response frames.

In one embodiment, a first optical device constant value is approximated by a frame time divided by the constant value; and wherein said determining the offset value based on said identified frame slip within said received response frames includes multiplying the first optical device constant value by the number of said received response frames, corresponding to the sequence of request frames, prior to said identified frame slip within said received response frames. In one embodiment, said received response frames includes two frame slips; and wherein the method includes determining the first optical device constant value based on a frame time and the number of received frames between said two frame slips. In one embodiment, the first optical device constant frame value is the frame time divided by the sum of one and the number of received frames between said two frame slips.

In one embodiment, said determining the offset value based on said identified frame slip within said received response frames includes multiplying a frame time by the number of said received response frames, corresponding to the sequence of request frames, prior to said identified frame slip within said received response frames divided by the maximum number of response frames that could be received without a single frame slip.

In one embodiment, each of the plurality of request frames corresponds to a multiframe, and each of the response frames corresponds to a multiframe.

One embodiment includes an optical device, comprising: an egress optical interface configured to send a plurality of request frames towards a second optical device over an optical transport network; an ingress optical interface configured to receive a corresponding plurality of response frames sent from the second optical device over the optical transport network; and one or more processing elements configured to processing different pairs of a particular response frame of the plurality of response frames and a corresponding particular request frame of the plurality of request frames to calculate a one-way delay measurement between the first optical device and the second optical device; wherein said processing different pairs includes identifying a frame slip within the plurality of response frames, and adjusting the one-way delay measurement by an offset value determined based on said identified frame slip.

In one embodiment, said identifying a frame slip includes: calculating roundtrip delays between request and response frames of said different pairs; and identifying a step difference in a said roundtrip delays. In one embodiment, each of the plurality of response frames corresponds to a variable delay imposed by the second optical device after receiving an identifiable request frame of the plurality of request frames and before responding to the identifiable request frame. In one embodiment, the variable delay increases by a constant value for each frame of the plurality of response frames; and wherein the offset value is the variable delay associated with the response frame immediately after said identified frame slip within said received response frames. In one embodiment, the variable delay increases by a constant value for each frame of the plurality of response frames; and wherein said determining the offset value based on said identified frame slip within said received response frames includes multiplying the constant value by the number of said received response frames, corresponding to the sequence of request frames, prior to said identified frame slip within said received response frames.

In one embodiment, wherein the variable delay increases by a constant value for each frame of the plurality of response frames; and wherein a first optical device constant value is approximated by a frame time divided by the constant value; and wherein said determining the offset value based on said identified frame slip within said received response frames includes multiplying the first optical device constant value by the number of said received response frames, corresponding to the sequence of request frames, prior to said identified frame slip within said received response frames. In one embodiment, said received response frames includes two frame slips; and wherein the method includes determining the first optical device constant value based on a frame time and the number of received frames between said two frame slips and wherein the first optical device constant frame value is the frame time divided by the sum of one and the number of received frames between said two frame slips. In one embodiment, the variable delay increases by a constant value for each frame of the plurality of response frames; and wherein said determining the offset value based on said identified frame slip within said received response frames includes multiplying a frame time by the number of said received response frames, corresponding to the sequence of request frames, prior to said identified frame slip within said received response frames divided by the maximum number of response frames that could be received without a single frame slip.

One embodiment includes an optical device, comprising: an ingress optical interface configured to receive a plurality of request frames from a first optical device over an optical transport network; an egress optical interface configured to send a corresponding plurality of response frames to the first optical device over an optical transport network; and one or more control elements configured to process each particular request frame of the plurality of request frames, including after a variable delay from receipt of the particular request frame, causing a next frame sent from the egress optical interface to be marked as a delay measurement response frame. In one embodiment, the variable delay increases by a constant value for each frame of the plurality of request frames.

Note, delay measurement specified in ITU-T Recommendation G.709 consists in a first node that initiates delay measurement sending a delay measurement message to a second node. The delay measurement message signal consists of a constant value (0 or 1) that is inverted at the beginning of a two-way delay measurement test. The transition from zero to one in the sequence . . . 00001111 . . . , or the transition from one to zero in the sequence . . . 11110000 . . . represents the path delay measurement start point. The new value of the delay measurement message signal is maintained until the start of the next delay measurement test. The message will travel through the network and once detected at the second node, the second node one will loop the delay measurement message signal, which will be sent in the OTN overhead of the next available frame.

Expressly turning to the figures, FIG. 1 illustrates a network 100 operating according to one embodiment. As shown, first optical device 102 is communicatively coupled to second optical device 104 through optical transport network (OTN) 110 via bi-directional optical connection 111. A one-way delay is measured from first optical device 102 to second optical device 104 based on roundtrip times of request and corresponding response frames. One embodiment enhances the technique of ITU-T Recommendation G.709, as the precision of its measurement is plus or minus one frame time. One embodiment adjusts a delay measure by a corresponding offset to the beginning of a frame in order to increase the accuracy of the one-way delay measurement to a small fraction of a frame time.

In one embodiment, first optical device 102 sends a sequence of delay measurement request frames to second optical device 104, which varies a local delay before responding to a request frame, thus causing a slippage in the sequence of reply frames received by first optical device 102. The point at which the request frames are received in second optical device 104 in relation to the stream of frames sent by second optical device 104 to first optical device 102 can be identified based on the frame slippage. Therefore, the delay measurement can be adjusted by a corresponding offset to the beginning of a frame in order to increase the accuracy of the one-way delay measurement.

Figure 2:
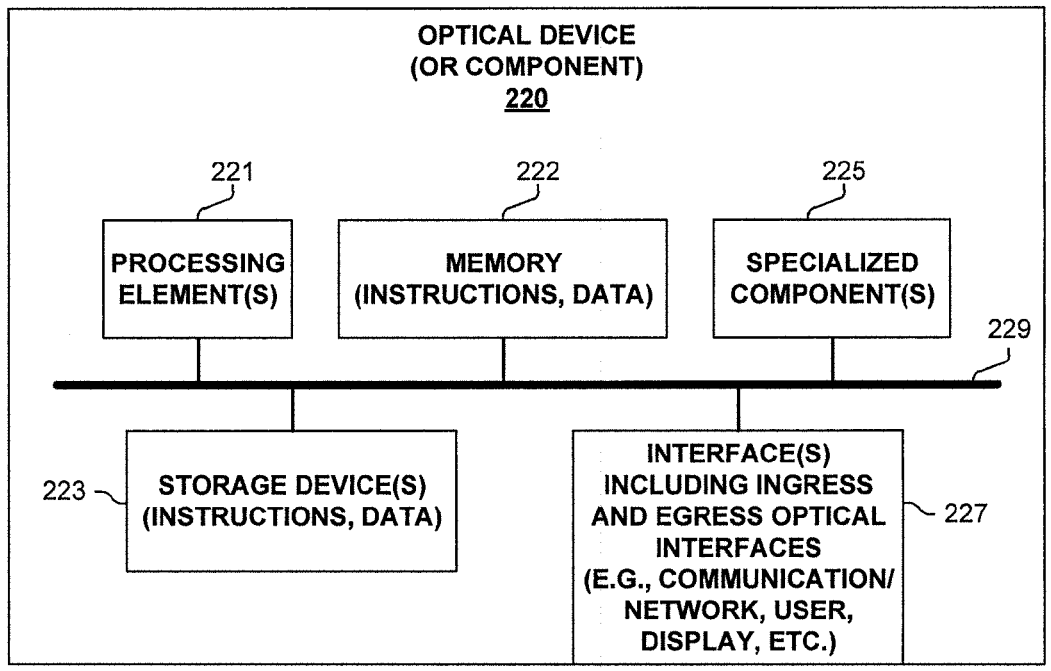
FIG. 2 illustrates an optical device according to one embodiment.

FIG. 2 is a block diagram of an optical device 220 (or component thereof) used in one embodiment associated with measuring delays between optical devices in an optical transport network (OTN). In one embodiment, optical device 220 performs one or more processes, or portions thereof, corresponding to one of the flow diagrams illustrated or otherwise described herein, and/or illustrated in another diagram or otherwise described herein.

In one embodiment, optical device 220 includes one or more processing element(s) 221, memory 222, storage device(s) 223, specialized component(s) 225 (e.g. optimized hardware such as for performing lookup and/or optical frame processing operations, etc.), and interface(s) 227 (including ingress and egress optical interfaces) for communicating information (e.g., sending and receiving frames, user-interfaces, displaying information, etc.), which are typically communicatively coupled via one or more communications mechanisms 229, with the communications paths typically tailored to meet the needs of a particular application.

Various embodiments of optical device 220 may include more or fewer elements. The operation of optical device 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
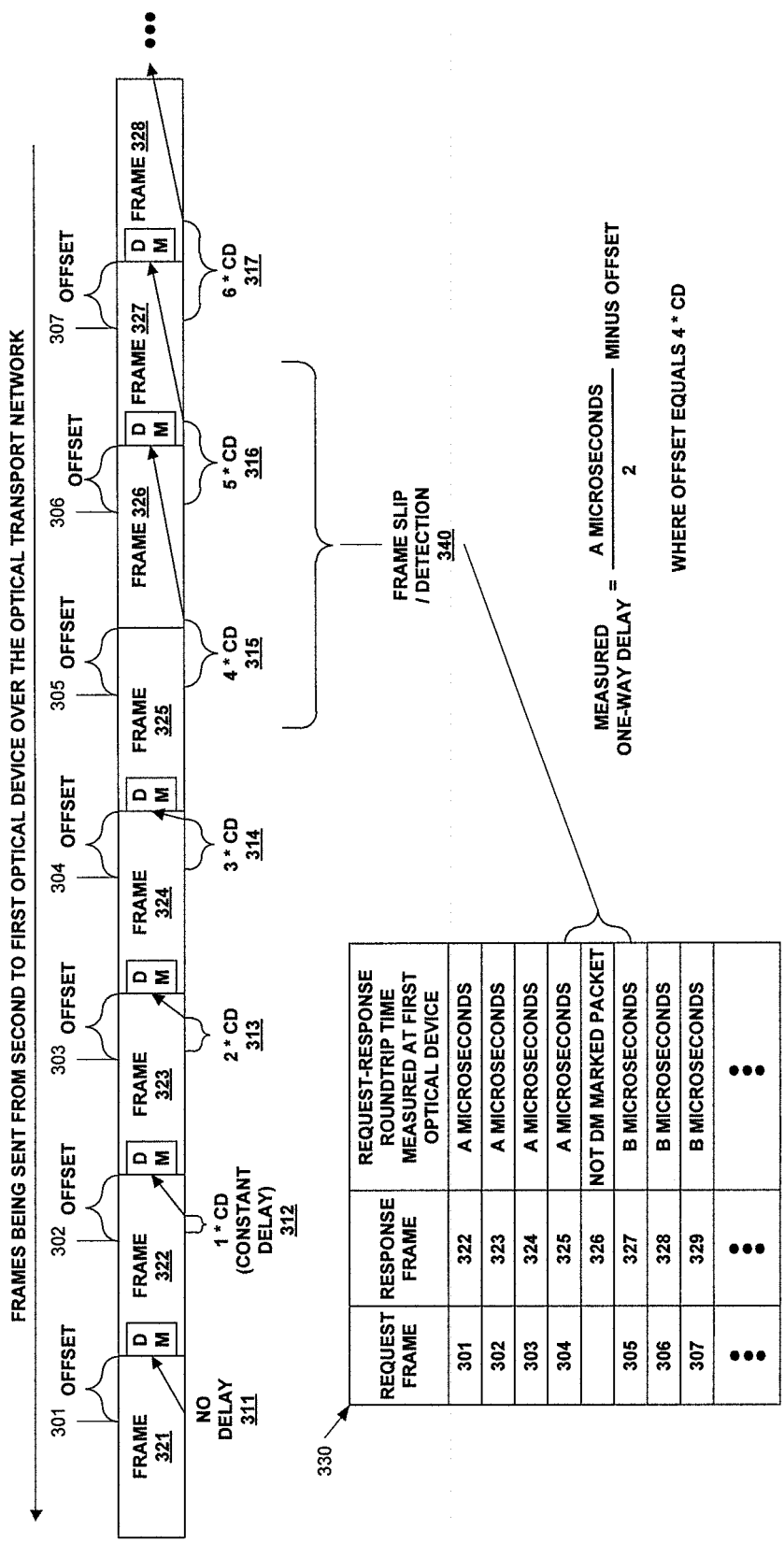
FIG. 3 illustrates the operation of one embodiment.

FIG. 3 illustrates the operation of one embodiment. Shown are a continuous sequence of frames 321-328 being sent from a second optical device to a first optical device. In an optical network, there is very little jitter, so that frames being received by the second optical device that are sent from the first device are received at a same relationship among sending and receiving frames as indicated by indications 301-307 with a same offset to start of frames 322-328.

In one embodiment, a first optical device sends a continuous stream of delay measure request frames (e.g., optical frames with a G.709 delay measurement request marking in their OTN overhead) which are received by the second optical device in relationship among sending and receiving frames as indicated by indications 301-307 with a same offset to start of frames 322-328. Second optical device increasing delays (311-317) by a constant value each time prior to marking a frame as a delay measurement reply frame, e.g., by adding a G.709 delay measurement request marking in the OTN overhead of a next frame being sent from the second optical device to the first optical device. This is illustrated in FIG. 3 by the arrow from each of the delays 311-316 to the delay measurement (DM) marking in the OTN overhead (e.g., the transition 11110000 or 00001111) of each of optical frames 322-328. As marked by frame slip indication 340, frame 326 does not include a delay measurement (DM) marking, which is referred to as a frame slippage as the DM marker associated with received delay request frame (305) is slipped to frame 327 (instead of into frame 326) due to delay 315. In one embodiment, delay 315 corresponds to the offset used for adjusting a delay measurement.

Table 330 illustrates the perspective of a first optical device based on the roundtrip times of sent delay measurement request frames and corresponding received delay measurement response frames. In particular, a round trip delay for each pairing of a delay measurement request frame and its corresponding received delay measurement response frame can be determined. For each of the pairings of request/response frames (301/322, 302/323, 303/324, and 304/325), a same roundtrip delay of A microseconds was measured in this example. For each of the pairings of request/response frames (305/327, 306/328, and 307/329), a same roundtrip delay of B microseconds was measured in this example. B microseconds is typically one frame time longer than A microseconds, due to the magnitude of delays 315, 316, 317) which cause the corresponding response frame to be delay an extra frame.

In one embodiment, the one-way delay measurement is calculated to be the roundtrip time before a frame slippage divided by two, and subtracting the offset to the beginning of the frame determined based on the detected frame slip. In one embodiment, this offset is determined by the number of corresponding response frames received prior to the detected frame slippage times the constant delay imposed by the second optical device.

Thus, in one embodiment illustrated by FIG. 3, the calculated/measured one-way delay measurement is A/2 microseconds minus four (4) times the constant delay (CD).

In one embodiment, this constant delay is a predetermined value (e.g., the same delay used by the responding optical device) configured on the first optical device or whatever device performs the one-way delay measurement calculations based on the measured roundtrip times. In one embodiment, this constant delay is determined by sending a consecutive stream of delay measurement request frames to generate two frame slippages to identify the number of request/response frames per frame time, thus this constant delay is the frame time divided by the number of request/response frames per frame time. In one embodiment, the number of request/response frames per frame time is configured on the first optical device or whatever device performs the one-way delay measurement calculations based on the measured roundtrip times. In one embodiment, the offset is the number of response frames received prior to the frame slippage divided by the number of request/response frames per frame time and multiplied by a frame time.

Note, one embodiment uses a constant delay that is smaller than a different one embodiment in order to increase the precision of its one-way delay measurement. In such an embodiment with a smaller constant delay, more request frames are sent in the sequence of request frames to ensure that that a frame slippage is induced in the stream of delay measurement response frames so that the offset can be determined therefrom.

Also, one embodiment sends a delay measurement request message once every multiframe (e.g., once every 256+1 frames equals once every 257 frames) for 256 consecutive multiframes. In one embodiment, the first delay measurement request message is in the first frame of the multiframe with its MFAS equal to zero. This allows the second device to readily determine the delay, which is its MFAS times the constant delay. In one embodiment, the constant delay used with multiframes is a frame time divided by 256. The operation of one embodiment using multiframes is that discussed in relation to FIG. 3, with each of frames 321-328 being a multiframe.

Figure 4A:
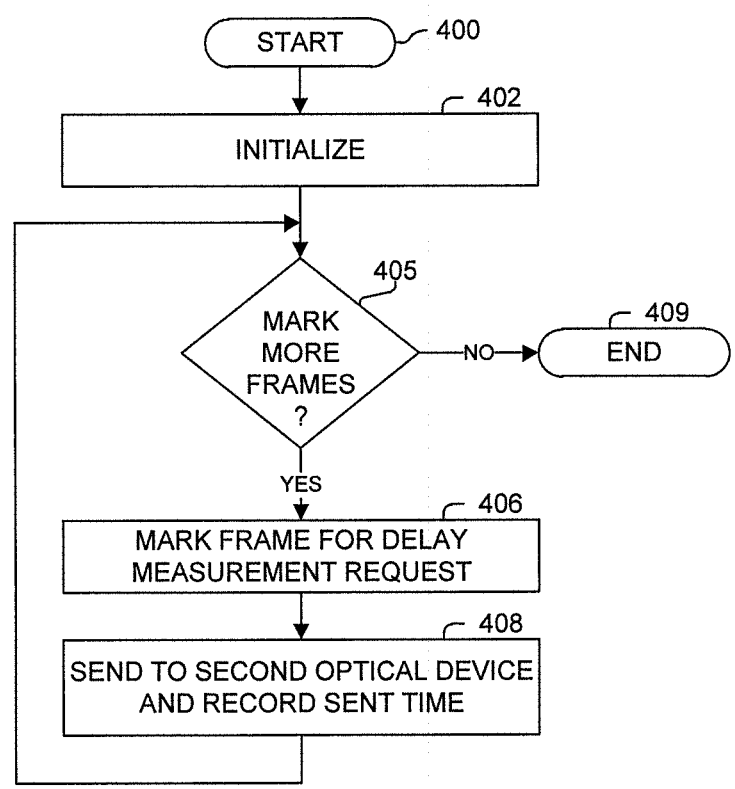
FIG. 4A illustrates a process according to one embodiment.

FIG. 4A illustrates a process performed by a first optical device in one embodiment. Processing begins with process block 400. In process block 402, initialization is performed (e.g., counters created or reset). As determined in process block 405, if more frames of a continuous stream of optical frames should be marked, then in process block 406, the next frame being sent to the optical device is marked as a delay measurement request frame. In process block 408, this frame is sent to the second optical device with the transmit time recorded for later determining a roundtrip time. Processing returns to process block 405. One embodiment sends enough delay measurement request packets to ensure that a frame slippage is induced in the delay measurement response frames. One embodiment sends at least the integer ceiling of a frame time divided by the constant delay number of frames. When enough request frames have been sent as determined in process block 405, processing of the flow diagram of FIG. 4A is complete as indicated by process block 409.

Figure 4B:
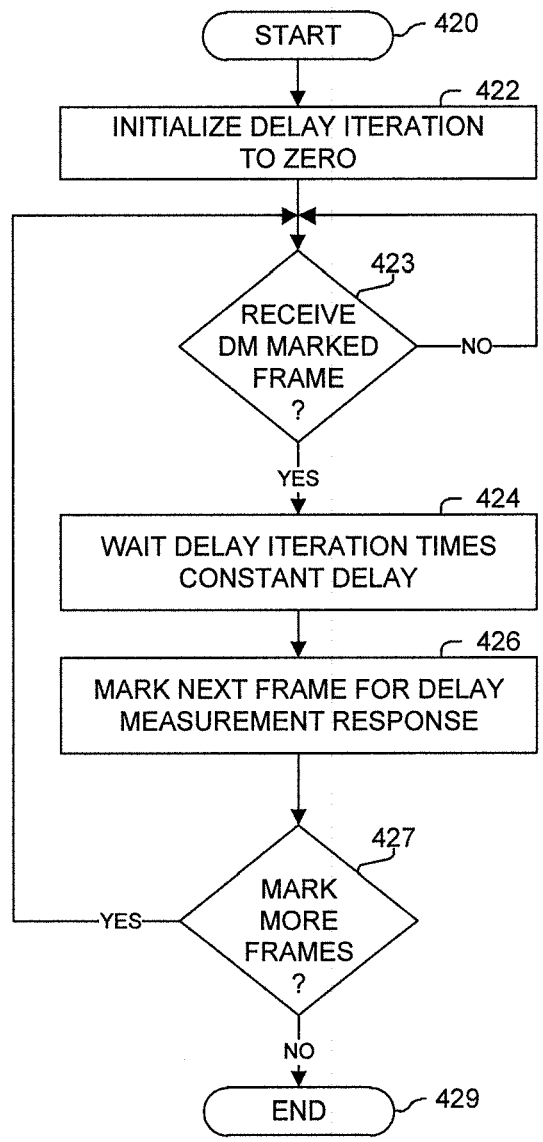
FIG. 4B illustrates a process according to one embodiment.

FIG. 4B illustrates a process performed by a second optical device in one embodiment. Processing begins with process block 420. In process block 422, initialization is performed, including to reset the delay to zero. As determined in process block 423, if a delay measurement (DM) request frame is received, then processing proceeds to process blocks 424, 426, and 427. In process block 424, the second optical device waits the variable delay (e.g., equal to the delay iteration variable times the predetermined constant delay). Then in process block 426, the second optical device marks the next frame as a delay measurement response frame. As determined in process block 427, if the processing of the flow diagram of FIG. 4B is complete, then processing is done as indicated by process block 429; otherwise, processing returns to process block 423 to wait for the receipt of the next delay measurement request frame.

Figure 4C:
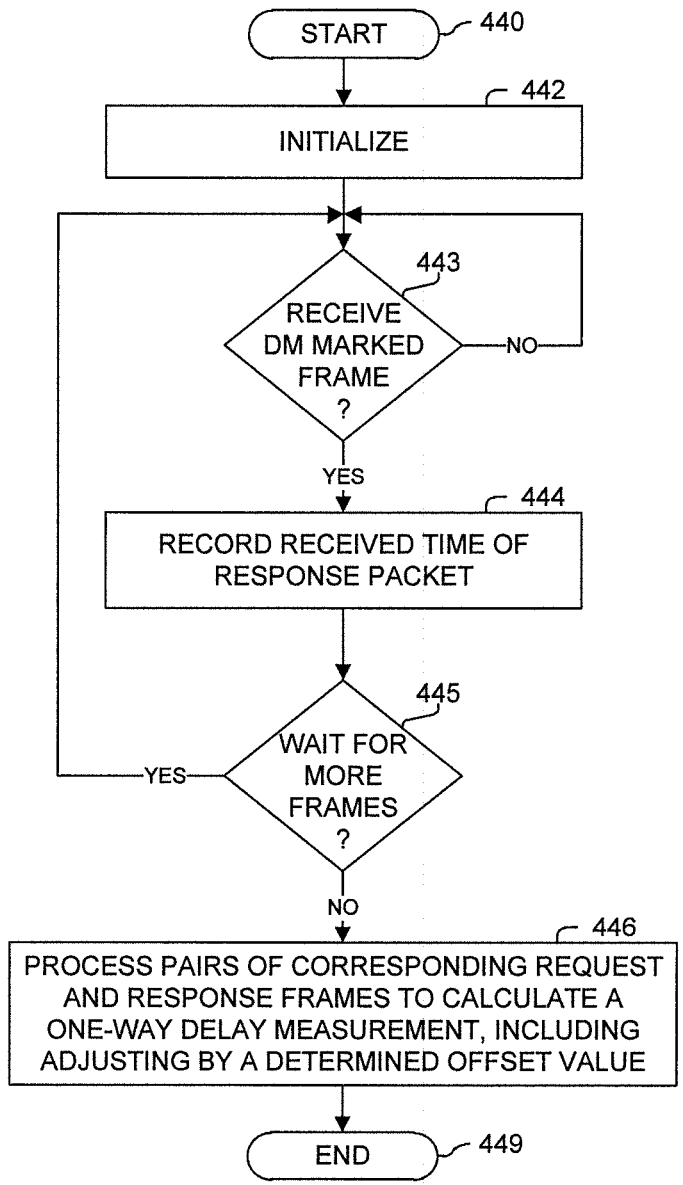
FIG. 4C illustrates a process according to one embodiment.

FIG. 4C illustrates a process performed by a first optical device in one embodiment. Processing begins with process block 440. In process block 442, initialization is performed (e.g., roundtrip data structure(s) created or reset). Processing then remains in block 443 until a delay measurement (DM) response frame has been received by the first optical device. Then, in process block 444, the received time of the delay measurement response frame is recorded in a data structure. As determined in process block 445, if more delay measurement response frames are expected, then processing returns to process block 443; otherwise, processing proceeds to process block 446. In process block 446, pairs of corresponding delay measurement request and response frames are processed to calculate a one-way delay measurement, including adjusting by a determined offset amount. Processing of the flow diagram of FIG. 4C is complete as indicated by process block 449.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
sending, from a first optical device towards a second optical device over an optical transport network, a sequence of request frames includes a plurality of request frames;
receiving, by the second optical device, each frame of the sequence of request frames;
for each particular request frame of the sequence of request frames, sending, by the second optical device towards the first optical device over the optical transport network, a particular response frame after imposing a variable delay after receiving said particular request frame and before adding a delay measurement marker to a frame to create the particular response frame;
receiving, by the first optical device, each said particular response frame; and
processing different pairs of corresponding said request frames and said response frames to calculate a one-way delay measurement between the first optical device and the second optical device; wherein said processing different pairs includes identifying a frame slip within said received response frames, and adjusting the one-way delay measurement by an offset value determined based on said identified frame slip within said received response frames.

2. The method of claim 1, wherein said identifying a frame slip includes: calculating roundtrip delays between request and response frames of said different pairs; and identifying a step difference in said roundtrip delays.

3. The method of claim 2, wherein the variable delay is an increasing value over the sequence of request frames.

4. The method of claim 3, wherein the offset value is the variable delay associated with the response frame immediately after said identified frame slip within said received response frames.

5. The method of claim 2, wherein the variable delay increases by a constant value for each frame of the sequence of request frames.

6. The method of claim 5, wherein said determining the offset value based on said identified frame slip within said received response frames includes multiplying the constant value by the number of said received response frames, corresponding to the sequence of request frames, prior to said identified frame slip within said received response frames.

7. The method of claim 5, wherein a first optical device constant value is approximated by a frame time divided by the constant value; and wherein said determining the offset value based on said identified frame slip within said received response frames includes multiplying the first optical device constant value by the number of said received response frames, corresponding to the sequence of request frames, prior to said identified frame slip within said received response frames.

8. The method of claim 7, wherein said received response frames includes two frame slips; and wherein the method includes determining the first optical device constant value based on a frame time and the number of received frames between said two frame slips.

9. The method of claim 5, wherein said determining the offset value based on said identified frame slip within said received response frames includes multiplying a frame time by the number of said received response frames, corresponding to the sequence of request frames, prior to said identified frame slip within said received response frames divided by the maximum number of response frames that could be received without a single frame slip.

10. The method of claim 1, wherein each of the plurality of request frames corresponds to a multiframe; and wherein each of the response frames corresponds to a multiframe.

11. An optical device, comprising:
an egress optical interface configured to send a plurality of request frames towards a second optical device over an optical transport network;
an ingress optical interface configured to receive a corresponding plurality of response frames sent from the second optical device over the optical transport network;
one or more processing elements configured to processing different pairs of a particular response frame of the plurality of response frames and a corresponding particular request frame of the plurality of request frames to calculate a one-way delay measurement between the first optical device and the second optical device; wherein said processing different pairs includes identifying a frame slip within the plurality of response frames, and adjusting the one-way delay measurement by an offset value determined based on said identified frame slip.

12. The optical device of claim 11, wherein said identifying a frame slip includes: calculating roundtrip delays between request and response frames of said different pairs; and identifying a step difference in a said roundtrip delays.

13. The optical device of claim 12, wherein each of the plurality of response frames corresponds to a variable delay imposed by the second optical device after receiving an identifiable request frame of the plurality of request frames and before responding to the identifiable request frame.

14. The optical device of claim 13, wherein the variable delay increases by a constant value for each frame of the plurality of response frames; and wherein the offset value is the variable delay associated with the response frame immediately after said identified frame slip within said received response frames.

15. The optical device of claim 13, wherein the variable delay increases by a constant value for each frame of the plurality of response frames; and wherein said determining the offset value based on said identified frame slip within said received response frames includes multiplying the constant value by the number of said received response frames, corresponding to the sequence of request frames, prior to said identified frame slip within said received response frames.

16. The optical device of claim 13, wherein the variable delay increases by a constant value for each frame of the plurality of response frames; and wherein a first optical device constant value is approximated by a frame time divided by the constant value; and wherein said determining the offset value based on said identified frame slip within said received response frames includes multiplying the first optical device constant value by the number of said received response frames, corresponding to the sequence of request frames, prior to said identified frame slip within said received response frames.

17. The optical device of claim 16, wherein said received response frames includes two frame slips; and wherein the method includes determining the first optical device constant value based on a frame time and the number of received frames between said two frame slips and wherein the first optical device constant frame value is the frame time divided by the sum of one and the number of received frames between said two frame slips.

18. The optical device of claim 13, wherein the variable delay increases by a constant value for each frame of the plurality of response frames; and wherein said determining the offset value based on said identified frame slip within said received response frames includes multiplying a frame time by the number of said received response frames, corresponding to the sequence of request frames, prior to said identified frame slip within said received response frames divided by the maximum number of response frames that could be received without a single frame slip.

19. An optical device, comprising:
an ingress optical interface configured to receive a plurality of request frames from a first optical device over an optical transport network;
an egress optical interface configured to send a corresponding plurality of response frames to the first optical device over an optical transport network; and
one or more control elements configured to process each particular request frame of the plurality of request frames, including after a predetermined variable delay from receipt of the particular request frame, causing a next frame sent from the egress optical interface to be marked as a delay measurement response frame, with different predetermined variable delays being used for different frames of the plurality of request frames.

20. The optical device of claim 19, wherein the predetermined variable delay increases by a constant value for each frame of the plurality of request frames.

* * * * *